US 11,559,059 B2
(12) United States Patent
Wills et al.

(10) Patent No.: US 11,559,059 B2
(45) Date of Patent: Jan. 24, 2023

(54) POULTRY SKINNER (71) Applicant: Prime Equipment Group, LLC, Columbus, OH (US)

(72) Inventors: Wyatt W. Wills, Newark, OH (US); Barry K. Jones, Columbus, OH (US); Richard K. Reis, Mt. Gilead, OH (US); Cezary J. Mroz, Elkhorn, WI (US)

(73) Assignee: Prime Equipment Group, LLC, Columbus, OH (US)

( * ) Notice: Subject to any disclaimer, the term of this patent is extended or adjusted under 35 U.S.C. 154(b) by 24 days.

(21) Appl. No.: 17/304,306

(22) Filed: Jun. 17, 2021

(65) Prior Publication Data

US 2022/0400693 A1 Dec. 22, 2022

(51) Int. Cl.
*A22C 21/00* (2006.01)
*B65G 13/06* (2006.01)
*B65G 23/44* (2006.01)

(52) U.S. Cl.
CPC ...... *A22C 21/0092* (2013.01); *A22C 21/0053* (2013.01); *B65G 13/06* (2013.01); *B65G 23/44* (2013.01)

(58) Field of Classification Search
CPC ............ A22C 21/0092; A22C 21/0053; B65G 13/06; B65G 23/44
See application file for complete search history.

(56) References Cited

U.S. PATENT DOCUMENTS

| 6,264,542 | B1 * | 7/2001 | Gasbarro | ............... A22C 25/17 452/125 |
| 9,565,862 | B2 | 2/2017 | Avey et al. | |
| 9,999,234 | B1 * | 6/2018 | Diab | .................. A22C 21/0053 |
| 11,001,451 | B2 | 5/2021 | Gagne | |
| 2013/0157553 | A1 * | 6/2013 | Haines | ............... A22C 21/0092 452/125 |

FOREIGN PATENT DOCUMENTS

| CN | 110203622 A | 9/2019 |
| EP | 1 498 365 A1 | 1/2005 |

OTHER PUBLICATIONS

International Search Report and Written Opinion dated Oct. 5, 2022, issued in corresponding International Patent Application No. PCT/US2022/033242, filed Jun. 13, 2022, 14 pages.

* cited by examiner

*Primary Examiner* — Richard T Price, Jr.
(74) *Attorney, Agent, or Firm* — Christensen O'Connor Johnson Kindness PLLC (57) ABSTRACT An apparatus 10 for removing the skin of poultry pieces includes a frame 12 for supporting an infeed conveyor 14 for transporting and feeding poultry pieces to be skinned to a skinning station 16 located closely adjacent the downstream end of the conveyor. An outfeed conveyor 18 is also supported by the frame to carry the skinned poultry pieces away from the skinning station 16 for further processing. The infeed and outfeed conveyors are carried by a lift mounting systems 40 and 42 to mount the conveyors to the underlying frame 12. The lift mounting systems 40/42 function to shift the infeed and outfeed conveyors between an in-use lowered position closely adjacent the skinning station 16 and a retracted position raised above and shifted longitudinally away from the skinning station to provide access to the conveyors 14/18, as well as access to the skinning station 16.

23 Claims, 9 Drawing Sheets

POULTRY SKINNER

BACKGROUND

The skin of poultry pieces is often removed prior to retail sales due to consumer demands. Automated skin removal apparatuses have been developed for removing the skin from poultry pieces without the need to perform this task manually. In the apparatus, the skin is gripped and pull away from or off of the underlying flesh at a skinning station while the poultry pieces are being transported to the skinning station on an infeed conveyor, and then the poultry pieces with the skin removed are transported away from the skinning station on an outfeed conveyor. As can be appreciated, it is necessary to periodically clean the skinning apparatus, including the infeed conveyor, the skinning station, and the outfeed conveyor to remove skin, flesh, and other matter lodged on apparatus. Such cleaning is difficult due in part to the inaccessibility of the skinning station, which is located in close proximity between the adjacent ends of the infeed and outfeed conveyors.

Also, the close proximity of the components of the skinning apparatus makes it cumbersome to make repairs and/or to replace worn or damaged components of the apparatus, for example, the belts of the infeed and outfeed conveyors. Typically it is necessary to disassemble a significant part of the apparatus to gain the necessary access for repair and component replacement. The present disclosure seeks to provide a poultry skinning apparatus that addresses the foregoing shortcomings.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a poultry product processing apparatus is provided. The poultry product processing apparatus comprises a processing station, an infeed conveyor for transporting poultry pieces to the processing station, the infeed conveyor having an endless conveyor belt for carrying the poultry pieces, an outfeed conveyor for transporting the skinned poultry pieces away from the processing station, the outfeed conveyor having an endless conveyor belt for carrying the processed poultry pieces, a first lift mounting system to mount the infeed conveyor to the processing apparatus to shift the infeed conveyor between an in-use lowered position and a retracted position raised relative to the processing station to provide access to the endless belt of the infeed conveyor, and a second lift mounting system to mount the outfeed conveyor to the processing apparatus to shift the outfeed conveyor between an in-use lowered position and a retracted position raised relative to the processing station to provide access to the endless belt of the outfeed conveyor.

In any of the embodiments described herein, wherein the infeed conveyor comprises a proximal end portion adjacent the processing station and a distal end portion disposed away from the processing station, and the distal end portion of the infeed conveyor comprising an idler roller mounted on a first tensioning assembly, the first tensioning assembly adjustable to apply a tension load to the endless belt of the infeed conveyor and to relax the tension on the endless belt of the infeed conveyor.

In any of the embodiments described herein, wherein the first tensioning assembly comprising pivot arms on which the idler roller of the infeed conveyor is mounted, the pivot arms pivotable between an engaged position wherein the idler roller supports the endless belt of the infeed conveyor in an in-use taught condition and a disengaged position wherein the idler roller supports the endless belt of infeed conveyor in a slack condition.

In any of the embodiments described herein, wherein the outfeed conveyor comprises a proximal end portion adjacent the processing station and a distal end portion disposed away from the skinning station, and the distal end portion of the outfeed conveyor comprising an idler roller mounted on a second tensioning assembly, the second tensioning assembly adjustable to apply a tension load to the endless belt of the outfeed conveyor and to relax the tension on the endless belt of the outfeed conveyor.

In any of the embodiments described herein, wherein the second tensioning assembly comprises pivot arms on which the idler roller of the outfeed conveyor is mounted, the pivot arms pivotable between an engaged position, wherein the idler roller supports the endless belt of the outfeed conveyor in an in-use taught condition, and a disengaged position, wherein the idler roller supports the endless belt of outfeed conveyor in a slack condition.

In any of the embodiments described herein, further comprising a frame structure for supporting the infeed conveyor and the outfeed conveyor in relative position to each other.

In any of the embodiments described herein, wherein the first and second lift mounting systems comprise rotatable actuators connected between the frame and the infeed conveyor and between the frame and the outfeed conveyor.

In any of the embodiments described herein, wherein the rotatable actuators simultaneously lift the infeed and outfeed conveyors upwardly relative to the frame and longitudinally away from the processing station relative to the lengths of the conveyors.

In any of the embodiments described herein, wherein the first lift mounting system comprises a first four-bar linkage arrangement connected between the frame and the infeed conveyor In any of the embodiments described herein, wherein the second lift mounting system comprises a second four-bar linkage arrangement connected between the frame and the outfeed conveyor In any of the embodiments described herein, further comprising a locking mechanism for locking the infeed conveyor and the outfeed conveyor to frame when in lower in-use position.

In any of the embodiments described herein, wherein the frame structure comprises a first longitudinal side and an opposite second longitudinal side, and the locking mechanism is operable from one of the first and second longitudinal sides of the frame structure.

In any of the embodiments described herein, wherein the infeed conveyor comprises a proximal end portion adjacent the processing station, the proximal end portion comprising a first drive roller for driving the infeed conveyor belt, and further comprising a drive motor for driving the infeed conveyor, and further comprising a drivetrain disposed between the drive motor and the drive roller of the infeed conveyor to transfer torque from the drive motor to the drive roller of the infeed conveyor, the drivetrain comprising a-quick-disconnect drive link between the drive motor and the drive roller of the infeed conveyor.

In any of the embodiments described herein, wherein the outfeed conveyor comprises a proximal end portion adjacent the processing station, the proximal end portion comprising a second drive roller for driving the outfeed conveyor belt, and the drivetrain transferring torque from the drive motor to the drive roller of the outfeed conveyor, the drivetrain comprising a-quick-disconnect drive link between the drive motor and the drive roller of the outfeed conveyor.

In any of the embodiments described herein, wherein the drivetrain connected simultaneously to the drive motor and the driver rollers of the infeed conveyor and outfeed conveyor.

In any of the embodiments described herein, wherein the drivetrain comprises drive links to engage and disengage the drive motor and the driver rollers of the infeed and the outfeed conveyors.

In any of the embodiments described herein, wherein the drive links are manually graspable to slidably engage the drive rollers of the infeed conveyor and outfeed conveyor and to slidably disengage the drive roller of the infeed conveyor and outfeed conveyor.

In any of the embodiments described herein, further comprising a frame structure for supporting the infeed conveyor and the outfeed conveyor in relative position to each other, wherein the frame structure comprises a first longitudinal side and an opposite second longitudinal side, and wherein drive links are manually graspable from one of the first and second longitudinal sides of the frame structure.

In any of the embodiments described herein, wherein the drivetrain comprises a gear housing mounter on the frame to receive torque from the drive motor and to the drive rollers of the infeed and outfeed conveyors.

In any of the embodiments described herein, wherein the drivetrain comprises drive links extending between the gear housing and the drive rollers of the infeed and outfeed conveyors, the drive links configured to be manually operable to engage and disengage the gear housing and the drive roller of the infeed and outfeed conveyors.

In accordance with one embodiment of the present disclosure, a poultry product skinning apparatus is provided. The poultry product skinning apparatus comprises a skinning station, an infeed conveyor for transporting poultry pieces to the skinning station, the infeed conveyor having an endless conveyor belt for gripping the poultry pieces, an outfeed conveyor for transporting the skinned poultry pieces away from the skinning station, the outfeed conveyor having an endless conveyor belt for gripping the skinned poultry pieces, a first lift mounting system to mount the infeed conveyor to the poultry product skinning apparatus to shift the infeed conveyor between an in-use lowered position and a retracted position raised relative to the skinning station to provide access to the endless belt of the infeed conveyor, a second lift mounting system to mount the outfeed conveyor to the poultry product skinning apparatus to shift the outfeed conveyor between an in-use lowered position and a retracted position raised relative to the skinning station to provide access to the endless belt of the outfeed conveyor.

In any of the embodiments described herein, wherein the infeed conveyor comprises a proximal end portion adjacent the processing station, the proximal end portion comprising a first drive roller for driving the infeed conveyor belt, and further comprising a drive motor for driving the infeed conveyor, and further comprising a drivetrain disposed between the drive motor and the drive roller of the infeed conveyor to transfer torque from the drive motor to the drive roller of the infeed conveyor, the drivetrain comprising a quick-disconnect drive link between the drive motor and the drive roller of the infeed conveyor.

In any of the embodiments described herein, wherein the outfeed conveyor comprises a proximal end portion adjacent the processing station, the proximal end portion comprising a second drive roller for driving the outfeed conveyor belt; and the drivetrain transferring torque from the drive motor to the drive roller of the outfeed conveyor, the drivetrain comprising a-quick-disconnect drive link between the drive motor and the drive roller of the outfeed conveyor.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

Referring initially to FIGS. 1-4, an apparatus 10 for removing the skin of poultry pieces includes a basic form, a frame 12 for supporting an infeed conveyor 14 for transporting and feeding poultry pieces to be skinned to a skinning station 16 located closely adjacent the downstream end of the conveyor. An outfeed conveyor 18 is also supported by the frame to carry the skinned poultry pieces away from the skinning station for further processing. The infeed conveyor 14 and outfeed conveyor 18 include endless belts 20 and 22, respectively. The endless belt 20 is trained around an end roller 24 at the downstream end of the infeed conveyor 14. A pinch block 26 is configured with a concave pinch surface 28 having curvature closely following the curvature of the endless belt 20 trained around the end roller 24 to define a narrow gap 30 therebetween for capturing the skin of the poultry piece and forcing the skin through the gap 30, thereby pulling the skin away from the underlying flesh of the poultry piece.

A transfer roller 32, located between the adjacent ends of the infeed and outfeed conveyors 14 and 18, assists in transferring the skinned poultry piece to the outfeed conveyor. In addition, a hold down structure 36 is provided for applying downward pressure on the poultry piece as the poultry piece is carried by the infeed conveyor 14 towards the skinning station 16, while the poultry skin is being removed, and also while the skinned poultry piece is being transferred from the infeed conveyor 14 to the outfeed conveyor 18.

The infeed conveyor 14 is carried by a lift mounting system 40 to mount the infeed conveyor to the underlying frame 12. The lift mounting system 40 functions to shift the infeed conveyor between an in-use lowered position closely adjacent the skinning station 16 and a retracted position raised above and shifted longitudinally away from the skinning station to provide access to the infeed conveyor 14, including its endless belt 20, as well as access to the skinning station.

Likewise, outfeed conveyor 18 is carried by a lift mounting system 42 to mount the outfeed conveyor to the underlying frame 12. The lift mounting system 42 functions to shift the outfeed conveyor between an in-use, lowered position closely adjacent the skinning station 16 and a retracted position raised above and shifted longitudinally downstream away from the skinning station 16 to provide access to the outfeed conveyor 18, including its endless belt 22, as well as access to the skinning station.

Next, describing the skinning apparatus 10 in greater detail, the apparatus includes the frame 12, which supports the infeed conveyor 14, the outfeed conveyor 18, pinch block 26, and transfer roller 32 at a desired elevation. The frame 12 includes support legs 50 extending downwardly from a rectangular base structure 52. The legs 50 can be adjustable in height to enable the apparatus to be leveled if needed. The base structure 52 in turn supports overhead, upright, longitudinally extending side structures 54 and 56 that extend along and beneath the opposite sides of the infeed and outfeed conveyors 14 and 18 to be coextensive with the lengths of the conveyors. The ends of the side structures are tied together by transverse end plates 57. The side structures 54 and 56 can be constructed from multiple components that are assembled or otherwise affixed together to form an integral structure, or the side structures can be constructed from a singular complement that is formed into the shape shown in the figures.

A collection pan 58, with sloped side walls, is positioned within the frame base structure 52, beneath the skinning station 16 to collect the skin removed from the poultry pieces and to direct such collected skin to a collection bin, not shown, located beneath the pan 58. In this regard, the pan 58 includes a central outlet opening 59 positioned over the collection bin.

Figure 1:
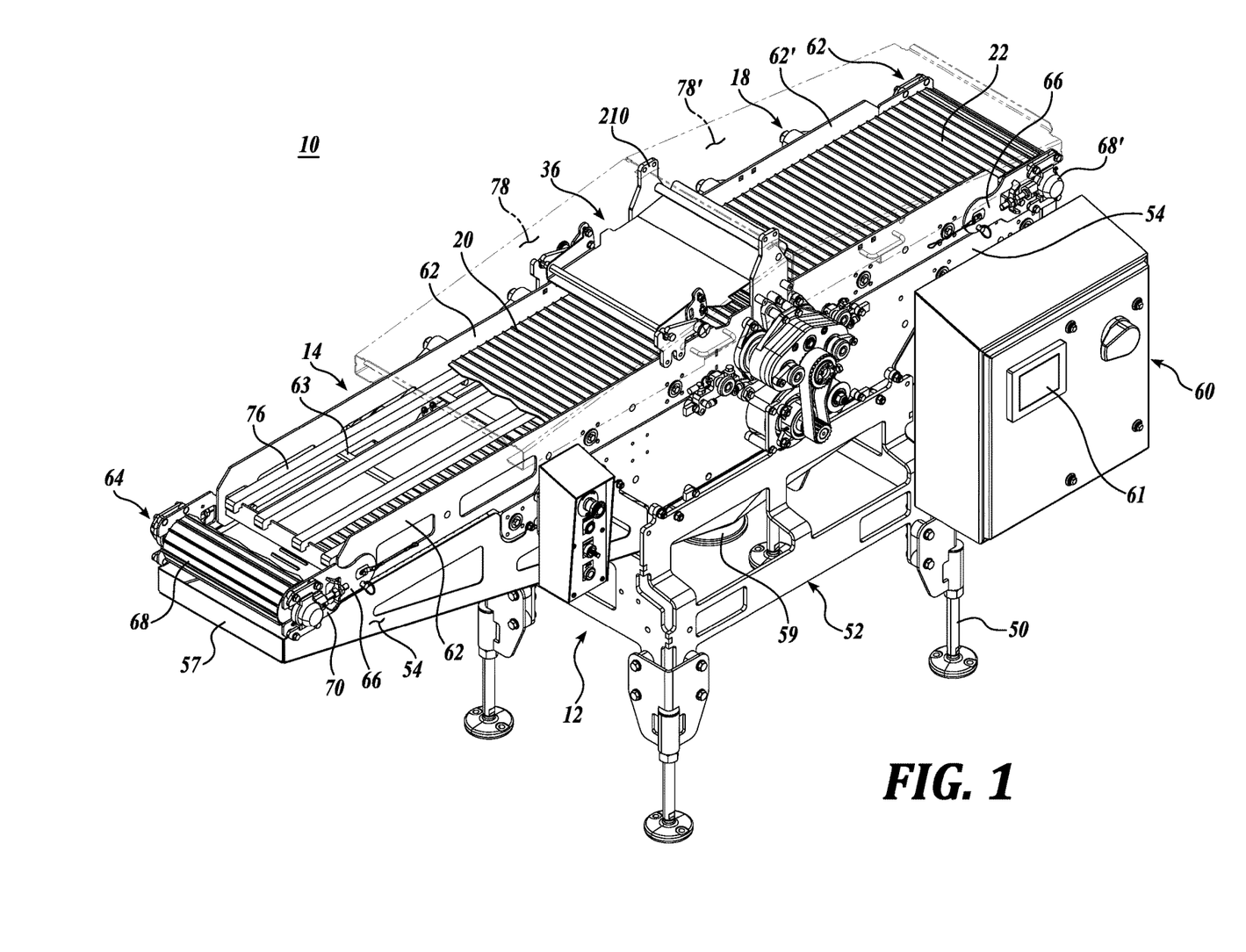
FIG. 1 is a pictorial view of an embodiment of the present disclosure with exterior parts removed to enable the interior of the poultry skinning apparatus to be viewed.

A control panel 60 is mounted on the frame 12 at what will be referred to as the "front side" of the apparatus 10, since this is the side of the apparatus at which the apparatus controls are located. The opposite side of the apparatus will be referred as the "back side." As shown in FIG. 1, the control panel includes a touch screen 61 to enter control instructions for the apparatus and to view operational parameters of the apparatus and other information regarding the apparatus including its operation and performance Although the control panel 60 is shown as mounted on the frame 12, the control panel can be located elsewhere, and signals to and from the apparatus are transmitted wirelessly.

Next, referring specifically to FIGS. 1-4, 7, and 8, the infeed conveyor 14 includes a frame that is constructed as a unitary structure composed of longitudinal side panels 62 interconnected by a series of transverse connectors or rods 63 so as to create a rigid structure. The conveyor frame supports a driven roller 24 at the downstream end of the conveyor 14, as well as an idler roller assembly 64 at the upstream end of the conveyor. The idler roller assembly 64 includes arms 66, which are pivotally mounted to the conveyor side panels 62 so as to project beyond the ends of the conveyor side panels 62 to carry in support an idler roller 68. The idler roller assembly 64 can pivot between a position extending longitudinally from the conveyor side panels 62, wherein the conveyor belt 20 is in taut condition, and a position extending transversely (upwardly) to the conveyor side panels, wherein the conveyor belt is in relaxed or slack condition to facilitate installation and removal of the conveyor belt 20. See FIG. 4.

The level of desired tension on the conveyor belt 20 can be adjusted via an adjustment structure 70 to adjust the position the idler roller 68 along the length of the pivot arms 66. In this regard, the ends of the idler roller 68 are mounted on a carriage or slide, which in turn slides along a slot formed along the length of the pivot arms 66.

The upper run of the conveyor belt 20 is supported by an underlying structure along which the belt slides. Such structure can be of various constructions. For example, a plurality of laterally spaced-apart, longitudinal beam members 76 can extend along the length of the conveyor 14 between the idler roller assembly 64 and the end roller 24 of the conveyor. These beam members can be supported by the transverse connectors or rods 63. Alternatively, a solid deck can be positioned beneath the upper run of the conveyor belt. This deck may be coated with a low friction, anti-wear surface, or a separate low friction, anti-wear panel can be attached to the top of the deck.

A cover 78, shown in phantom line, covers a portion of the infeed conveyor 14 during the operation of apparatus 10. The cover 78 rests on the upper edges of the conveyor side panels 62. The cover 78 is hinged to mounting posts 210, which allows the cover to be rotated ninety degrees into open position thereby providing access to the infeed conveyor and to the skinning station 16.

Figure 2:
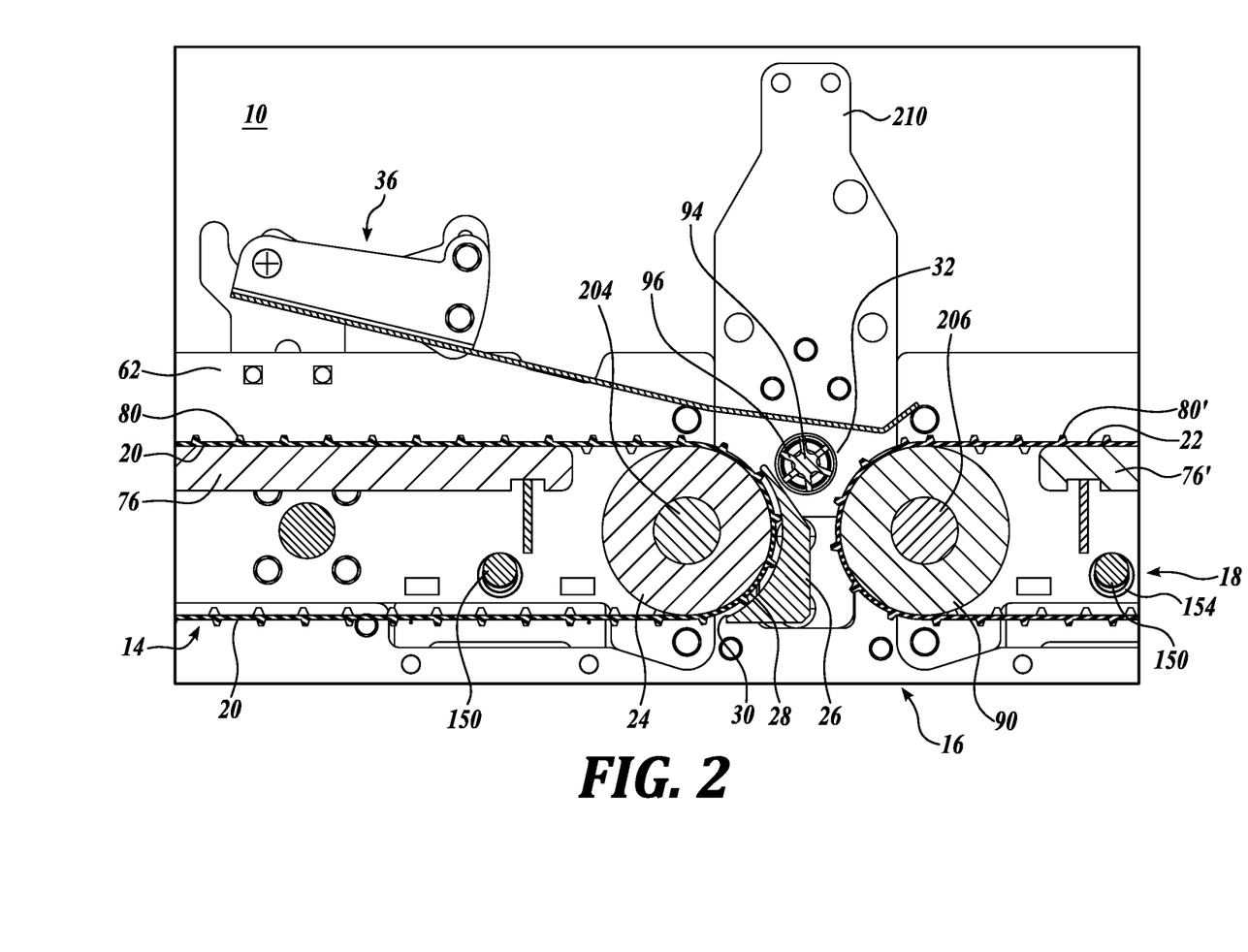
FIG. 2 is an enlarged fragmentary view of FIG. 1, taken along lines 2-2 thereof.
Figure 3:
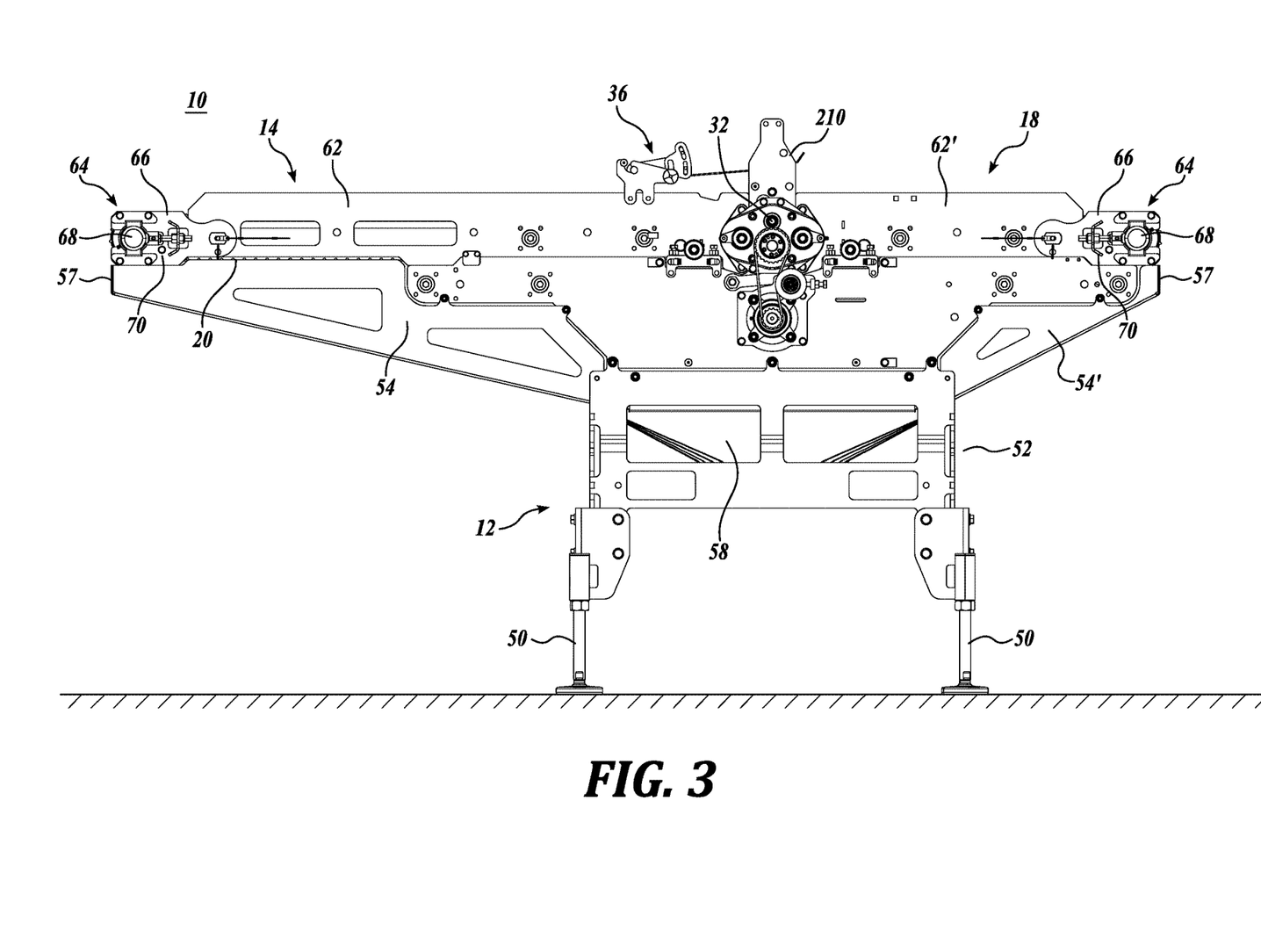
FIG. 3 is a side elevational view of FIG. 1 viewed from the front side of the apparatus with parts removed to more clearly view the drivetrain of the apparatus.

The infeed conveyor belt 20 is depicted as including outwardly projecting flights or ribs 80 that extend across the width of the belt while being spaced apart along the width of the belt. The flights/ribs 80 enable the belt to grip the exterior of the skin of the poultry piece being transported on the belt, as well as while the skin is being pulled through the gap 30 between the belt and the pinch surface 28 of the pinch block 26. In FIG. 2, the flights/ribs 80 in cross-section are shown to be in the form of truncated triangles. However, the flights/ribs 80 can be of other configurations, including having parallel sides. Further, the upper edge of the flights may be other than in a uniform elevation along the length of the flights. For instance, the upper edge of the flights may be undulating, have notches formed therein, or be of other profiles.

Alternatively, the infeed conveyor belt 20 may be textured or otherwise configured to enable the belt to grip the exterior of the skin of the poultry piece being transported on the belt, as well as while the skin is being pulled through the gap 30 formed between the belt and the pinch surface 28 of the pinch block 26. The texture on the belt may be in the form of protrusions extending upwardly from the belt substrate. The protrusions can be various cross-sectional shapes, for instance, circular. The protrusions may taper in the direction outwardly from the belt substrate, and may have rounded tips. The protrusions can be of other shapes, such as square, rectangular, triangular, arcuate, elliptical, oval, etc. Also, the protrusions may be arranged in an orderly pattern about the surface of the conveyor belt, or may be arranged in one or more random patterns.

As can be appreciated, the purpose of the flights or protrusions extending from the outer surface of the endless belt 20 is to grip the poultry pieces to urge the poultry pieces toward the pinch block 26, and also to urge the skinned portions of the poultry pieces forwardly toward the outfeed conveyor 18. To this end, the conveyor belt 20 may be textured otherwise than as described above. Moreover, the outfeed conveyor belt 22 may also be flighted or textured in a manner similarly to that of the infeed conveyor belt 20, or may be flighted or textured in a different manner, perhaps less aggressively than the infeed conveyor belt.

The outfeed conveyor 18 is constructed in a manner corresponding to the construction of the infeed conveyor 14, as described above. Except as otherwise specified, the part numbers for the outfeed conveyor 18 are the same as for the infeed conveyor 14, but with the addition of a prime ("'") designation. The outfeed conveyor 18 is shown in the figures as being of a shorter length than the infeed conveyor 14. However, the outfeed conveyor 18 can instead be of the same length, or even longer than, the infeed conveyor 14.

As discussed above, the skinning apparatus 10 includes a powered transfer roller 32 positioned between the infeed conveyor 14 and the outfeed conveyor 18. The transfer roller 32 serves to facilitate the transfer of the poultry pieces, with the skin removed, from the infeed conveyor 14 to be the outfeed conveyor 18. In this regard, the transfer roller 32 is positioned approximately midway between the downstream end roller 24 of the infeed conveyor 14 and the upstream roller 90 of the outfeed conveyor 28. In this location, the transfer roller 32 helps reduce the likelihood that the poultry pieces will become stalled between the infeed conveyor 14 and the outfeed conveyor 18. The transfer roller 32 is powered at a speed to facilitate transfer of the poultry pieces from the skinning station to the outfeed conveyor while but also so as not to damage the poultry piece being transferred to the outfeed conveyor. Typically, the infeed conveyor 14 and outfeed conveyor 18 operate at, or nearly at, the same speed.

To perform its function, the transfer roller 32 can be of various configurations. For example, as shown in FIG. 2, the transfer roller 32 can be constructed in the form of a central shaft 94 and a plurality of ribs or paddles 96 that radiate outwardly from the central shaft while extending along the length of the shaft. The paddles 96 are able to grip the underside of the skinned poultry piece and urged the poultry piece forwardly toward the outfeed conveyor 18. The overall size or diameter of the transfer roller 32 is selected so as to fit within the valley or gap formed by the end rollers 24 and 90 and still providing clearance from the pinch block 26. Also, the transfer roller 32 at its upper circumference is approximately at the same elevation as the upper surface of the endless belts 20 and 22 of the conveyors 14 and 18. In this regard, the transfer roller 32 may have a diameter of from about 1 to about 1.25 inches, but of course can be of a larger or smaller diameter As noted above, lift mounting systems 40 and 42 function to mount the infeed conveyor 14 and outfeed conveyor to the underlying frame 12. The lift mounting systems function to shift the infeed and outfeed conveyors between an in-use lowered position closely adjacent the skinning station 16 and a retracted position raised above and shifted longitudinally away from the skinning station so as to provide access to the infeed and outfeed conveyor 14 and 18, including their endless belts 20 and 22, as well as access to the skinning station.

Figure 7:
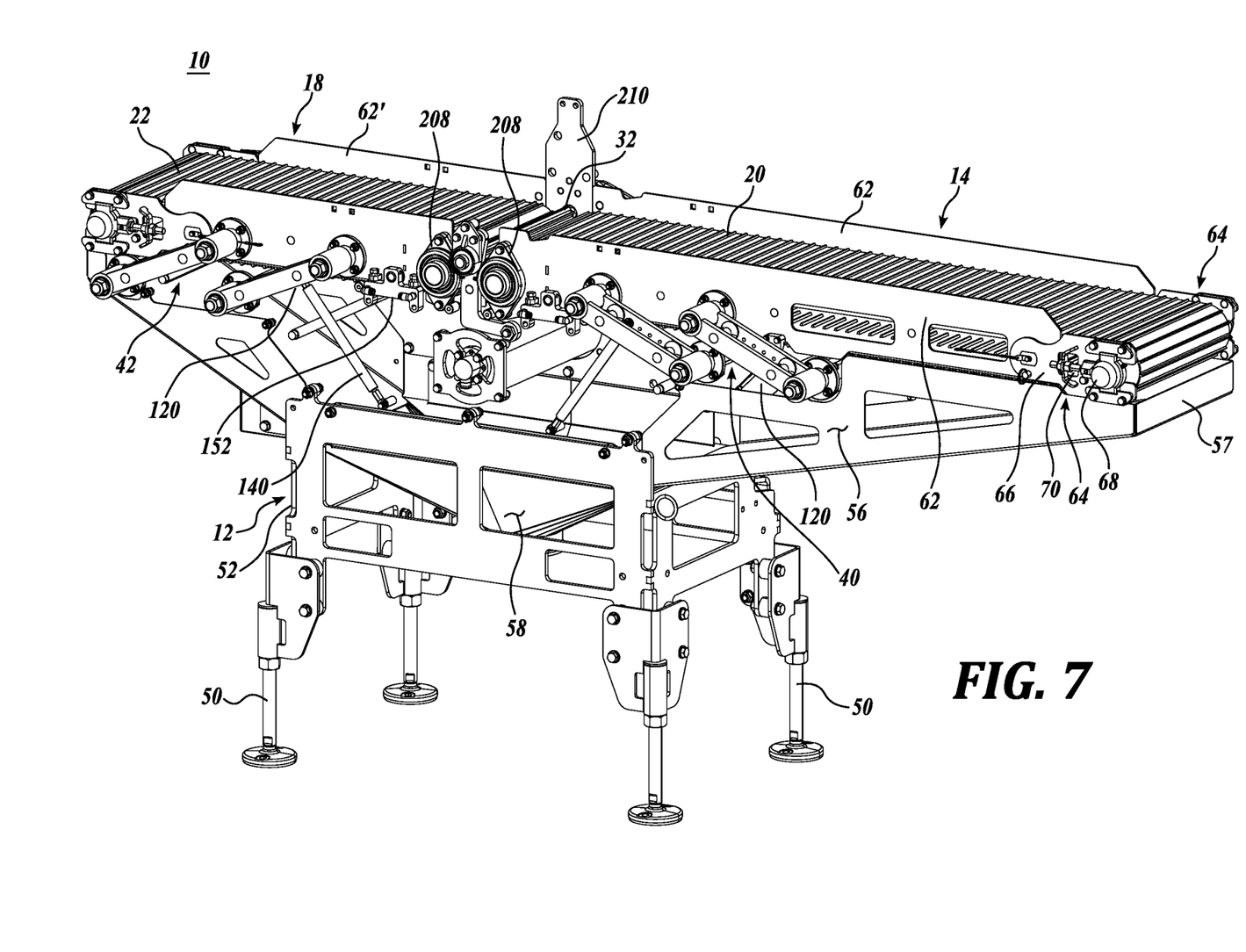
FIG. 7 is a pictorial view of the backside of the apparatus of FIG. 1, with parts removed so as to view an exemplary lift mechanism for the infeed and outfeed conveyors.
Figure 8:
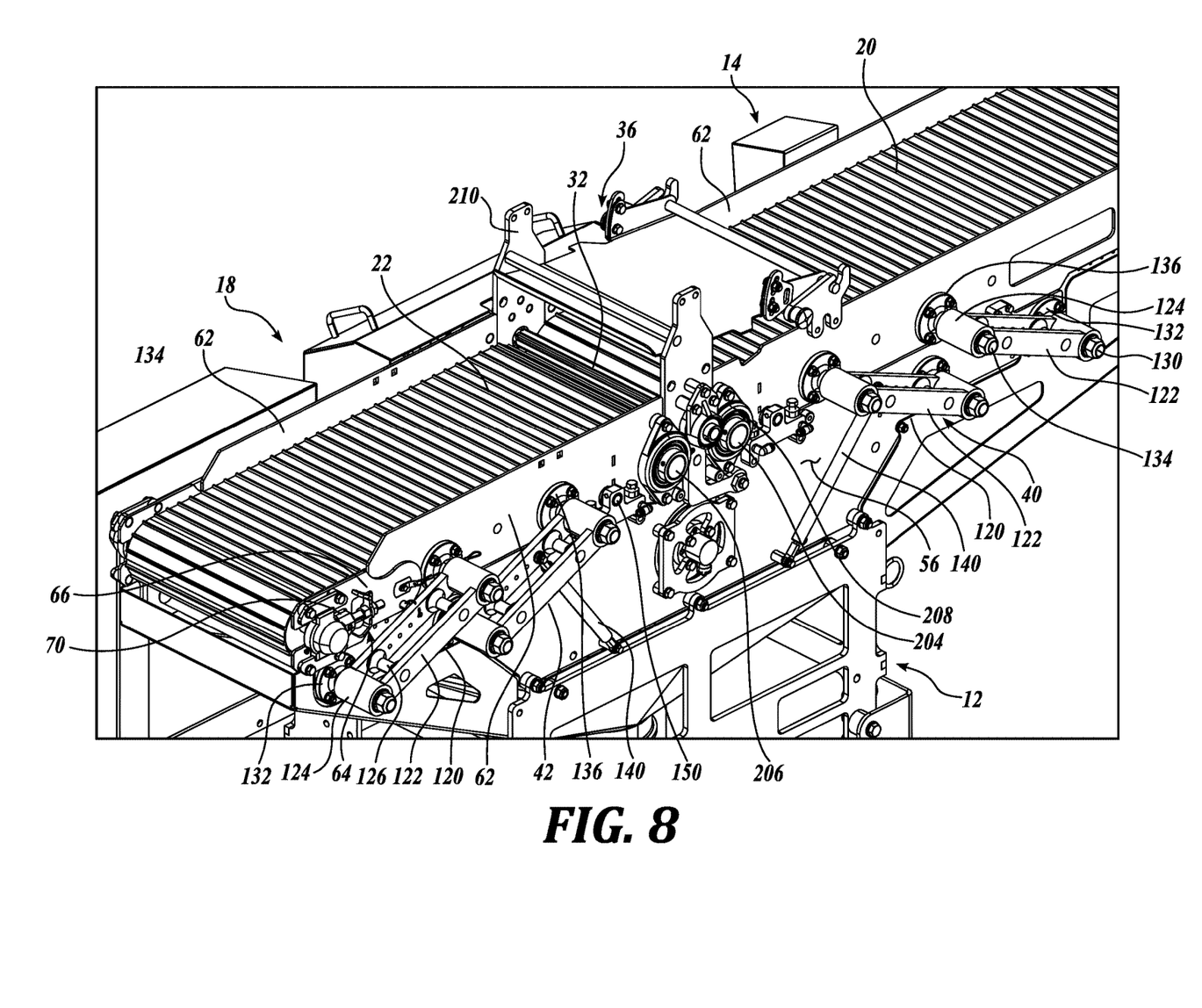
FIG. 8 is a fragmentary view of FIG. 7 taken from the opposite end portion of the apparatus.
Figure 9:
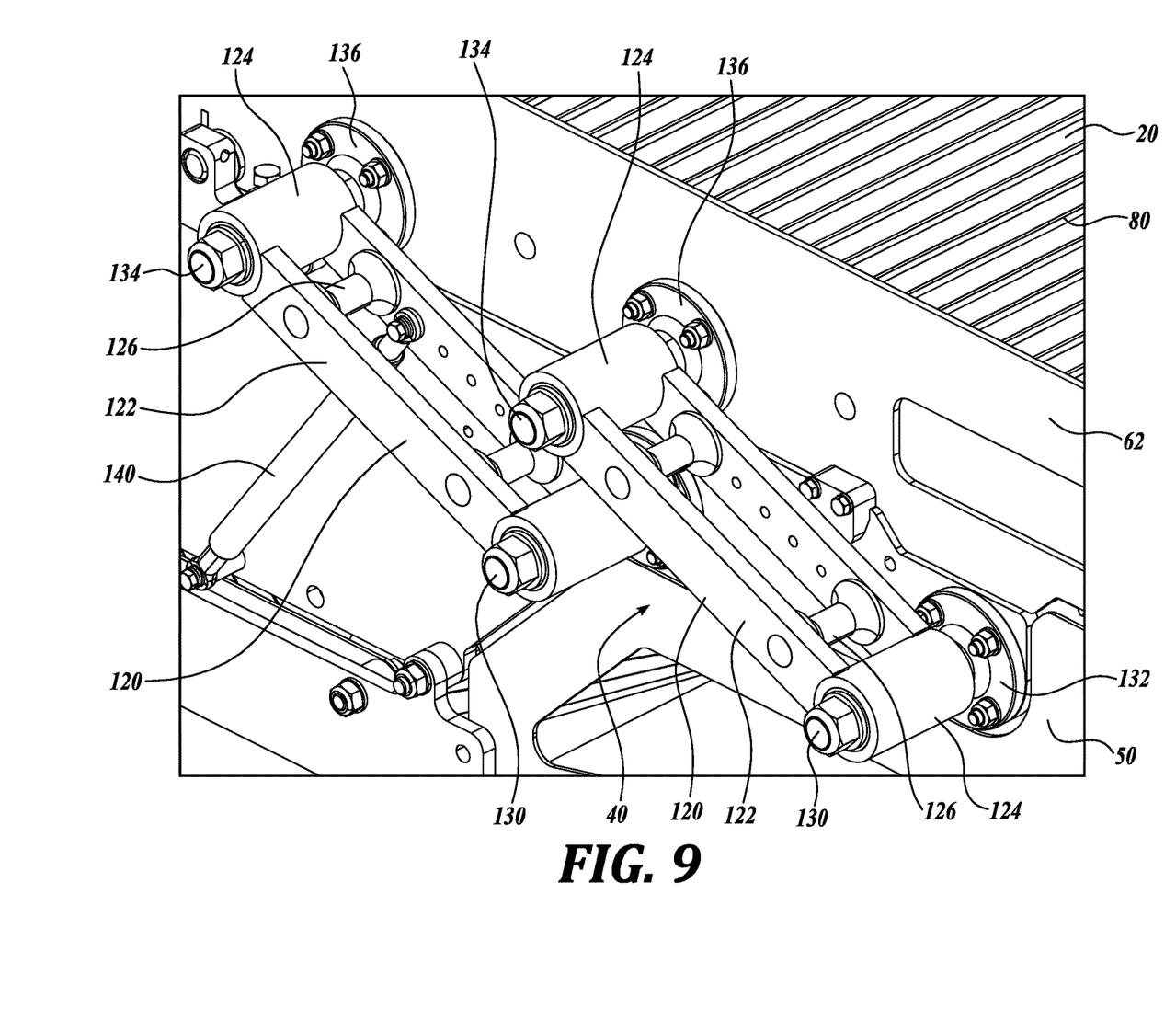
FIG. 9 is an enlarged fragmentary view of a portion of FIG. 7.

The construction of the lift mounting system 40 will be described with the understanding that the lift mounting system 42 is of corresponding construction. Referring specifically to FIGS. 7, 8, and 9, the lift mounting system 40 is in the form of actuators, and more specifically in the form of rotatable actuators. In one exemplary example, the rotatable actuators can be in the form of pivot arm structures 120 extending nominally in diagonal orientation between frame structure 56 and conveyor side panel 62. The lower ends of the pivot arm structures 120 are pivotally connected to the frame side structure 56 while the upper ends of the pivot structures are pivotally connected to the conveyor side panels 62.

The pivot arm structures 120 are composed of a pair of longitudinally extending, parallel spaced-apart arms members 122 spanning between end collars 124. The arm members 122 may be welded or otherwise securely attached to the collars 124. Spacer braces 126 span between the arms members 122 to provide additional rigidity to the pivot arm structures 120. It will be understood that rigidity can be added to the structures by other means. In addition, the pivot arm structures can be of constructions other than as described and illustrated above.

Lower pivot rods 130 project outwardly from mounting flanges 134 attached to the frame side structures to extend through the end collars 124 of the pivot arm structures. Likewise, upper pivot rods 134 130 project outwardly from mounting flanges 136 attached to the conveyor side panel 62 to extend through the end collars 124 of the pivot arm structures.

An actuator in the form of a gas spring 140 extends between the frame-based structure 52 and an arm member 122 to apply an upwardly directed force to the pivot arm structures 120, biasing the pivot arm structures to rotate so as to lift the infeed conveyor 14 in the upper direction. See, for example, FIG. 4. It will be appreciated that as the infeed conveyor 14 moves from its lowered "in use" position shown in FIGS. 1-3 to the upwardly retracted position shown in FIG. 4, the infeed conveyor shifts both upwardly relative to the skinning station 16 as well as longitudinally away from the skinning station. As such, the infeed conveyor 14 is readily accessible for cleaning, for repairing, as well as for replacing endless belt 22. Access is also provided to the skinning station.

The endless belt 22 can be conveniently replaced by pivoting the idler roller assembly 64 about its pivot axis on the conveyor side panels 62 to swing the idler roller assembly 64 upwardly, thereby placing the endless belt 22 in slack condition. Since the pivot arm structures 120 are only located at the backside of the apparatus, the endless belt 22 can be readily removed by sliding the belt off the front side of the infeed conveyor 14. The new belt can be installed on the infeed conveyor 14 by reversing this process.

Figure 5:
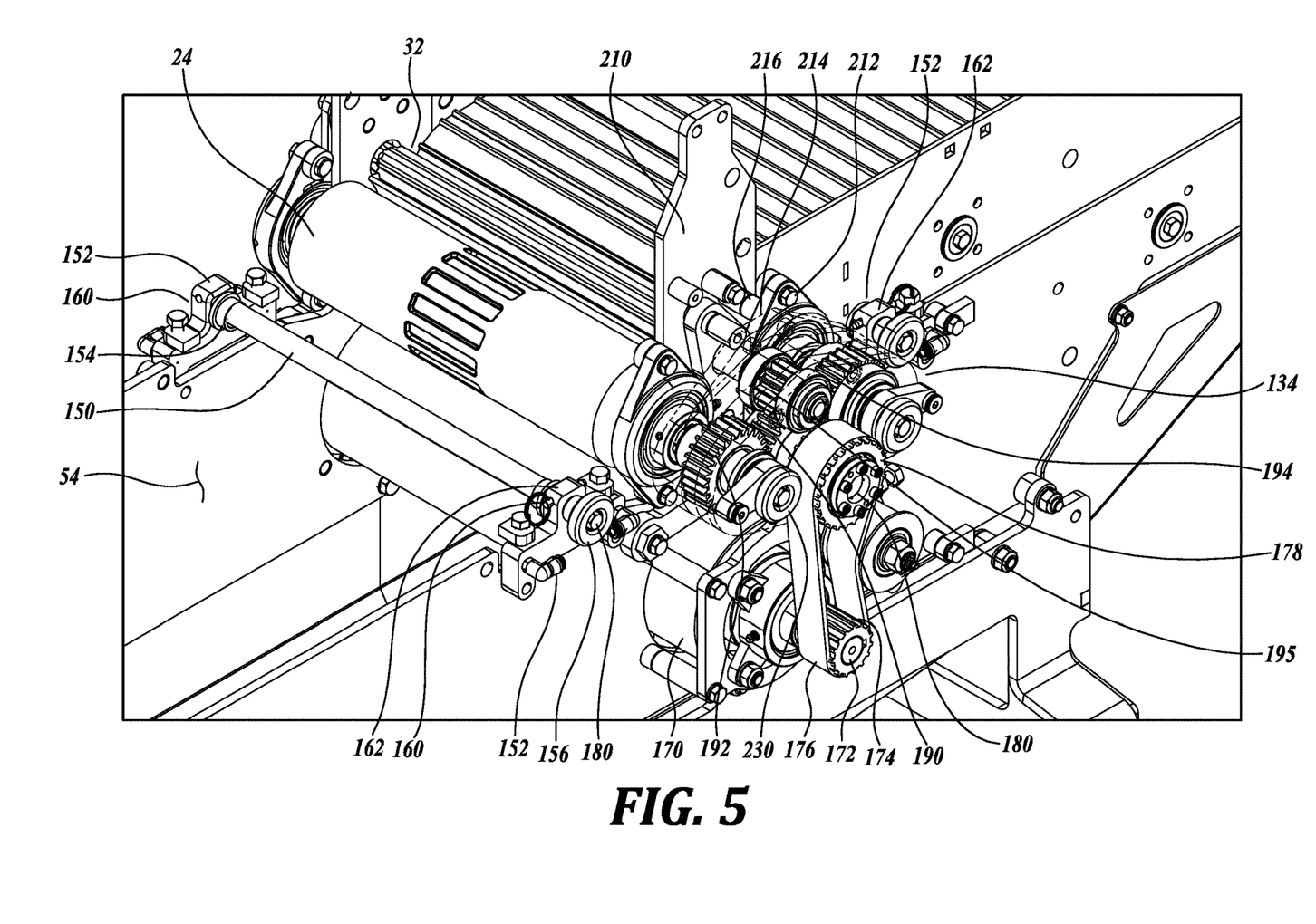
FIG. 5 is an enlarged fragmentary pictorial view of the drivetrain.
Figure 6:
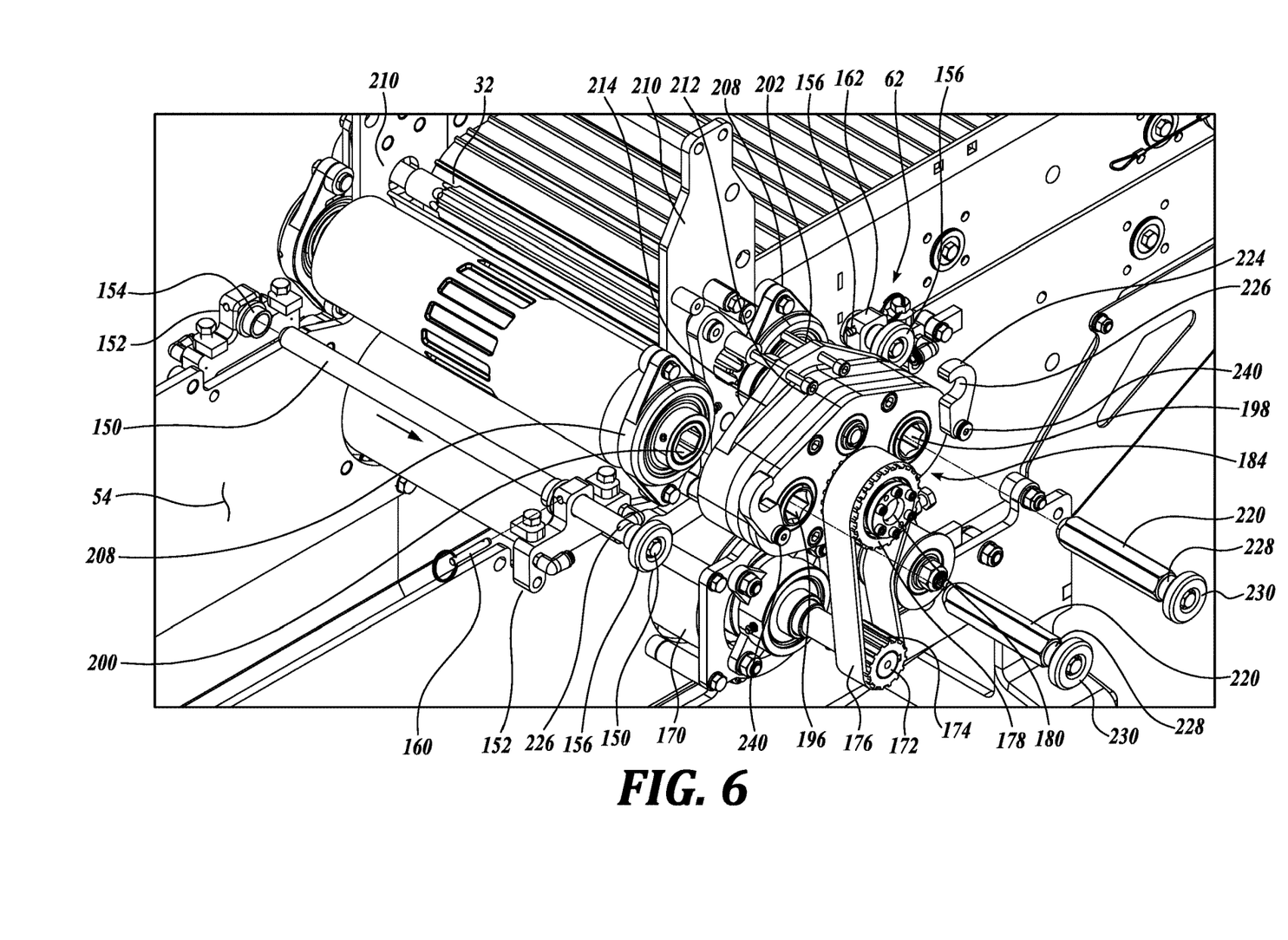
FIG. 6 is a view similar to FIG. 5 with the drivetrain disengaged from the infeed and outfeed conveyors.

Next, referring also to FIG. 5, the infeed conveyor 14 is locked into a downward "in use" position by a locking mechanism that is operable from the front side of the apparatus 10. In this regard, the ends of a pull rod 150 extend through close-fitting cross holes formed in pillow block structures 152 mounted to the frame side structures 54 and 56 close to the upper edges thereof. The pull rod 150 extends through the interior of close bushings 154 fixed to the conveyor side panels 62.

As shown in FIG. 5, a manually graspable circular knob 156 is attached to the end of the pull rod 150 exterior of the pillow block structure 152. The pivot rod 130 is locked in engagement with the pillow block structures 152 and the bushings 154 by a cross pin 160 that engages through across hole formed in the pillow block structure center section 162. A cross groove is formed transversely across the outer circumferential portion of the pivot rod 130 for closely receiving the cross pin 160 through, thereby preventing the pivot rod from moving longitudinally to its length.

It will be appreciated that by simply removing the cross pin 160, the pull rod 150 can be pulled longitudinally through the pillow blocks structures 152 and the bushings 154 to thereby permit the infeed conveyor 14 to be released from frame 12, so that the infeed conveyor can be conveniently lifted upwardly to its retracted position.

Figure 4:
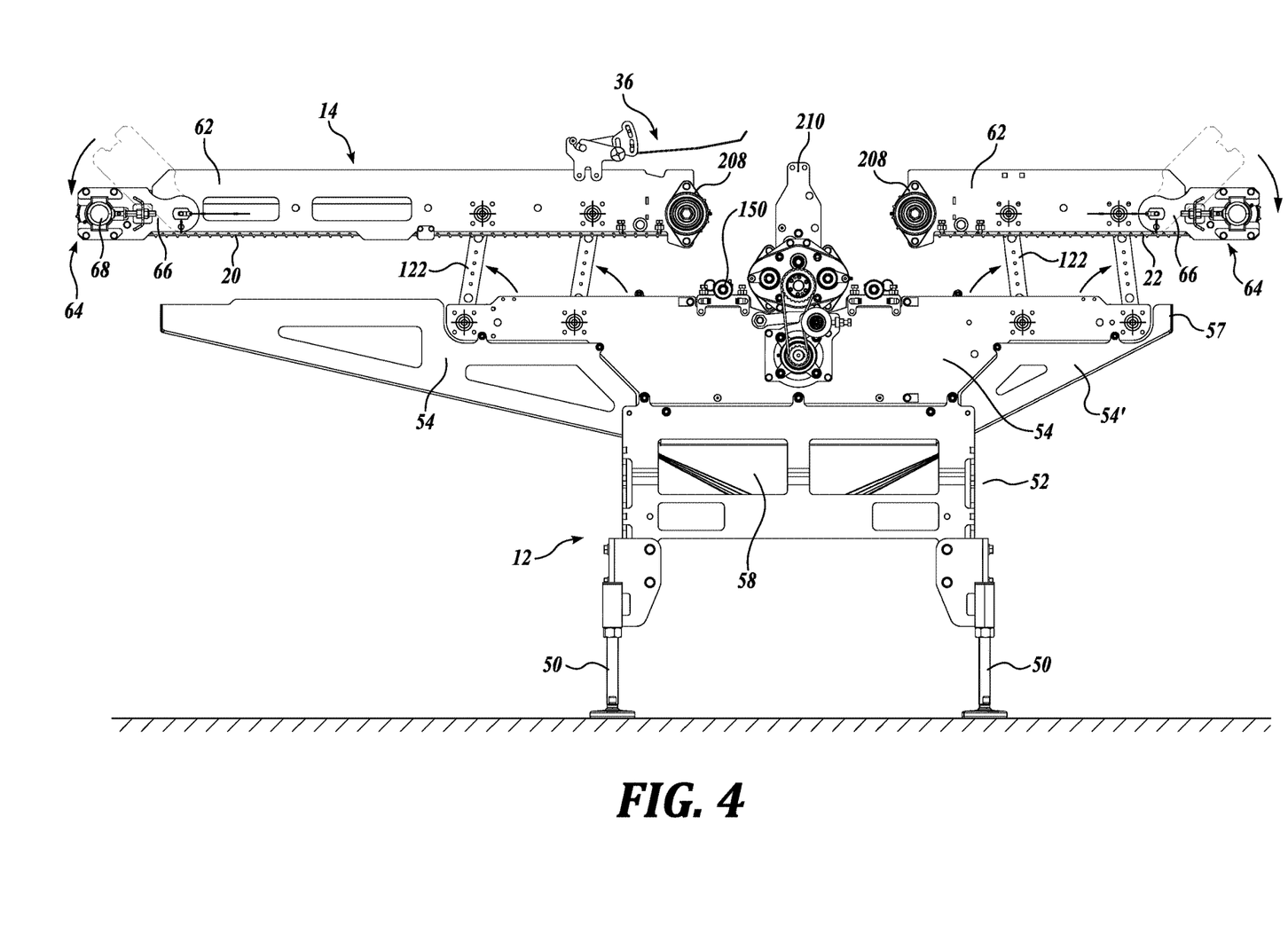
FIG. 4 is a view similar to FIG. 3 showing the infeed and outfeed conveyors than upwardly retracted position.

As can be appreciated, in order for the infeed and outfeed conveyors 14 and 18 to be retracted upwardly relative to the frame 12, as shown in FIG. 4, it is necessary to disengage the drive rollers 24 and 90 from the source of drive torque for the drive rollers, which source is mounted on the frame 12. Referring to FIGS. 1-6, the drive torque for the drive rollers 24 and 90 is provided by a drive motor 170 mounted on the frame 12 within the confines of the frame side structures 54 and 56 and generally centrally relative to the frame base structure 52. A drivetrain is provided to transmit the torque from the drive motor 170 to drive rollers 24 and 90. The drivetrain includes a driveshaft 172 extending from the motor 170 and out through a clearance opening formed in the frame side structure 54 at the front side of the frame. A cog drive gear 174 is mounted on the distal end of the driveshaft 172 to drivingly engage the lower portion of an endless cog belt 176. From the cog drive gear 174, the cog belt 176 extends upwardly to wrap a driven cog gear 178 mounted on the end of a driven shaft 180.

The driven shaft 180 extends inwardly into a gear transfer housing 184 of the drivetrain. Bearings or bushings are provided to anti-frictionally mount the driven shaft 180 relative to the housing 184. A drive gear 190 is splined or otherwise mounted on the driven shaft 180 within the housing to rotate with the driven shaft. The drive gear 190 engages driven gears 192 and 194 which are mounted on tubular axles 196 and 198, which in turn are mounted within bearings or bushings to anti-frictionally rotate within the housing 184.

The tubular axles 196 and 198 are aligned with blind bores 200 and 202 formed in the ends of axles 204 and 206 of the drive rollers 24 and 90 of the infeed and outfeed conveyors 14 and 18. The ends of the axles 204 and 206 are supported by flanged bearings 208 mounted the exterior sides of the conveyor side panels 62. Similar flanged bearings 208 are mounted on the opposite conveyor side panels 62.

The transfer housing 184 is mounted on a central mounting post 210 extending upwardly from the frame side structure 54. In this regard, bolts 212 extend through close-fitting through holes formed in a flange 214 extending above the top surface of the housing 184 and also extend through spacers 216 to threadably engage the mounting post. Bolts similar to bolts 212 extend through close-fitting through holes formed in a flange extending below the bottom surface of the housing 184 and also extend through spacers similar to spacers 216 to threadably engage the mounting post. When the transfer housing 184 is mounted on the central mounting post, there is a slight gap between the adjacent ends for the tubular axles 196/198 and the corresponding ends of the axles 204/206 defined by blind bores 196/198.

The drivetrain also includes removable drive pins 220 that slidably extend through the tubular axles 196 and 198 to extend into the corresponding blind bores 200 and 202 of the drive roller axles 204 and 206. The exterior of the drive pins 220 are of hexagonal cross sectional shape to match the interior shapes of the tubular axles 196 and 198 as well as the interior shapes of blind bores 200 and 202 of the drive roller axles so that the drive pins function to transmit torqued from the driven gears 192 and 194 to the drive roller axles 204 and 206. It is to be understood that the exterior configuration of the drive pins can be of other shapes such as octagonal or can be splined.

The removable drive pins 220 are held engaged within the tubular drive axle 196 and 198 and the corresponding tubular blind bores 200 and 202 of the drive roller axles by rotatable keepers 224. The keepers 224 are formed with a generally semicircular groove 226 that are shaped and sized to closely fit over reduced diameter sections 228 formed in the end portions of the drive pins. Such reduced-diameter sections are located between the hexagonal drive sections and enlarged, manually graspable heads 230 formed on the ends of the drive pins. The keepers 224 are pivotally mounted on the exterior of the housing 184 by hardware members 240. When the keepers engaged with the dive pins, the drive pins are securely held in engagement with the tubular drive axles 196 and 198 and the corresponding blind bore portions 200 and 202 of the drive roller axles 204 and 206.

As shown in FIG. 5, the drive gear 190 also powers the driven gear 195 of the transfer roller 32.

The procedure for retracing the infeed and outfeed conveyors 14/18 from the frame is quickly and simply accomplished from the front side of the apparatus 10. First, the cross pins 160 are removed from the pull rods 150 and then the pull rods drawn out from frame 12 and conveyors 14 and 18, thereby releasing the infeed and outfeed conveyors 14 and 18 from the frame 12. Next, the keepers are rotated out of engagement with the reduced diameter sections 228 of the drive pins 220. Thereafter, the drive pins can be manually slid out of the blind bores 200/202 and corresponding tubular axles 196/198 by simply grasping the heads 230 of the drive pins. Thereupon, the gas springs 140 will cause the pivot arm structures to swing upwardly to lift the infeed and outfeed conveyors 14 and 18 off of the frame 12 into the upwardly retracted position shown in FIG. 4. It can be appreciated that the conveyors 14 and 18 are thus accessible for cleaning, maintenance, repair, etc. without the need for any tools. Further, the skinning station 16 is also readily accessible for cleaning, maintenance, repair, etc.

Further, the endless belts 22 and 24 of the infeed and outfeed conveyors 14 and 18 can be conveniently removed by releasing the idler roller assemblies 64, thereby permitting by the roller assemblies to rotate from their positions shown in FIG. 4 to an upwardly extending position shown in dotted line in FIG. 4. This releases the tension load on the endless belts, causing the bells to become slack. As such, the belts can be slid off of their drive and idler rollers in the direction towards the front side of the apparatus. New endless belts 22 and 24 can be installed on the conveyors 14 and 18 by reversing this procedure.

While illustrative embodiments have been illustrated and described, it will be appreciated that various changes can be made therein without departing from the spirit and scope of the invention. In this regard, the apparatus of the present disclosure can be used for processing protein products beyond only poultry, but also include beef, fish, pork, etc. Further, the apparatus can be used to process other types food products such as produce.

The embodiments of the invention in which an exclusive property or privilege is claimed are defined as follows:

1. A poultry product processing apparatus, comprising:
   a processing station;
   an infeed conveyor for transporting poultry pieces to the processing station, the infeed conveyor having an endless conveyor belt for carrying the poultry pieces;
   an outfeed conveyor for transporting the skinned poultry pieces away from the processing station, the outfeed conveyor having an endless conveyor belt for carrying the processed poultry pieces;
   a first lift mounting system to mount the infeed conveyor to the processing apparatus to shift the infeed conveyor between an in-use lowered position and a retracted position raised relative to the processing station to provide access to the endless belt of the infeed conveyor; and
   a second lift mounting system to mount the outfeed conveyor to the processing apparatus to shift the outfeed conveyor between an in-use lowered position and a retracted position raised relative to the processing station to provide access to the endless belt of the outfeed conveyor.

2. The poultry product processing apparatus of claim 1, wherein the infeed conveyor comprises:
   a proximal end portion adjacent the processing station and a distal end portion disposed away from the processing station; and
   the distal end portion of the infeed conveyor comprising an idler roller mounted on a first tensioning assembly, the first tensioning assembly adjustable to apply a tension load to the endless belt of the infeed conveyor and to relax the tension on the endless belt of the infeed conveyor.

3. The poultry product processing apparatus of claim 2, wherein the first tensioning assembly comprising pivot arms on which the idler roller of the infeed conveyor is mounted, the pivot arms pivotable between an engaged position wherein the idler roller supports the endless belt of the infeed conveyor in an in-use taught condition and a disengaged position wherein the idler roller supports the endless belt of infeed conveyor in a slack condition.

4. The poultry product processing apparatus of claim 2, wherein the outfeed conveyor comprises:
   a proximal end portion adjacent the processing station and a distal end portion disposed away from the skinning station; and
   the distal end portion of the outfeed conveyor comprising an idler roller mounted on a second tensioning assembly, the second tensioning assembly adjustable to apply a tension load to the endless belt of the outfeed conveyor and to relax the tension on the endless belt of the outfeed conveyor.

5. The poultry product processing apparatus of claim 4, wherein the second tensioning assembly comprising pivot arms on which the idler roller of the outfeed conveyor is mounted, the pivot arms pivotable between an engaged position, wherein the idler roller supports the endless belt of the outfeed conveyor in an in-use taught condition, and a disengaged position, wherein the idler roller supports the endless belt of outfeed conveyor in a slack condition.

6. The poultry product processing apparatus of claim 1, further comprising a frame structure for supporting the infeed conveyor and the outfeed conveyor in relative position to each other.

7. The poultry product processing apparatus of claim 6, wherein the first and second lift mounting systems comprise rotatable actuators connected between the frame and the infeed conveyor and between the frame and the outfeed conveyor.

8. The poultry product processing apparatus of claim 7, wherein the rotatable actuators simultaneously lift the infeed and outfeed conveyors upwardly relative to the frame and longitudinally away from the processing station relative to the lengths of the conveyors.

9. The poultry product processing apparatus of claim 6, wherein the first lift mounting system comprising a first four-bar linkage arrangement connected between the frame and the infeed conveyor.

10. The poultry product processing apparatus of claim 9, wherein the second lift mounting system comprising a second four-bar linkage arrangement connected between the frame and the outfeed conveyor.

11. The poultry product processing apparatus of claim 6, further comprising a locking mechanism for locking the infeed conveyor and the outfeed conveyor to frame when in lower in-use position.

12. The poultry product processing apparatus of claim 11, wherein:
the frame structure comprising a first longitudinal side and an opposite second longitudinal side; and
the locking mechanism is operable from one of the first and second longitudinal sides of the frame structure.

13. The poultry product processing apparatus of claim 1:
wherein the infeed conveyor comprising a proximal end portion adjacent the processing station, the proximal end portion comprising a first drive roller for driving the infeed conveyor belt;
further comprising a drive motor for driving the infeed conveyor; and
further comprising a drivetrain disposed between the drive motor and the drive roller of the infeed conveyor to transfer torque from the drive motor to the drive roller of the infeed conveyor, the drivetrain comprising a-quick-disconnect drive link between the drive motor and the drive roller of the infeed conveyor.

14. The poultry product processing apparatus of claim 13:
wherein the outfeed conveyor comprising a proximal end portion adjacent the processing station, the proximal end portion comprising a second drive roller for driving the outfeed conveyor belt; and
the drivetrain transferring torque from the drive motor to the drive roller of the outfeed conveyor, the drivetrain comprising a-quick-disconnect drive link between the drive motor and the drive roller of the outfeed conveyor.

15. The poultry product processing apparatus of claim 14, wherein the drivetrain is connected simultaneously to the drive motor and the driver rollers of the infeed conveyor and outfeed conveyor.

16. The poultry product processing apparatus of claim 15, wherein the drivetrain comprising drive links to engage and disengage the drive motor and the driver rollers of the infeed and the outfeed conveyors.

17. The poultry product processing apparatus of claim 16, wherein the drive links are manually graspable to slidably engage the drive rollers of the infeed conveyor and outfeed conveyor and slidably disengage the drive roller of the infeed conveyor and outfeed conveyor.

18. The poultry product processing apparatus of claim 17, further comprising:
a frame structure for supporting the infeed conveyor and the outfeed conveyor in relative position to each other;
wherein the frame structure comprising a first longitudinal side and an opposite second longitudinal side; and
wherein drive links are manually graspable from one of the first and second longitudinal sides of the frame structure.

19. The poultry product processing apparatus of claim 13, wherein the drivetrain comprises a gear housing mounted on the frame to receive torque from the drive motor and to the drive rollers of the infeed and outfeed conveyors.

20. The poultry product processing apparatus of claim 19, wherein the drivetrain comprising drive links extending between the gear housing and the drive rollers of the infeed and outfeed conveyors, the drive links configured to be manually operable to engage and disengage the gear housing and the drive roller of the infeed and outfeed conveyors.

21. A poultry product skinning apparatus, comprising:
a skinning station;
an infeed conveyor for transporting poultry pieces to the skinning station, the infeed conveyor having an endless conveyor belt for gripping the poultry pieces;
an outfeed conveyor for transporting the skinned poultry pieces away from the skinning station, the outfeed conveyor having an endless conveyor belt for gripping the skinned poultry pieces;
a first lift mounting system to mount the infeed conveyor to the poultry product skinning apparatus to shift the infeed conveyor between an in-use lowered position and a retracted position raised relative to the skinning station to provide access to the endless belt of the infeed conveyor; and
a second lift mounting system to mount the outfeed conveyor to the poultry product skinning apparatus to shift the outfeed conveyor between an in-use lowered position and a retracted position raised relative to the skinning station to provide access to the endless belt of the outfeed conveyor.

22. The poultry product processing apparatus of claim 21:
wherein the infeed conveyor comprising a proximal end portion adjacent the processing station, the proximal end portion comprising a first drive roller for driving the infeed conveyor belt;
further comprising a drive motor for driving the infeed conveyor; and
further comprising a drivetrain disposed between the drive motor and the drive roller of the infeed conveyor to transfer torque from the drive motor to the drive roller of the infeed conveyor, the drivetrain comprising a quick-disconnect drive link between the drive motor and the drive roller of the infeed conveyor.

23. The poultry product processing apparatus of claim 22:
wherein the outfeed conveyor comprising a proximal end portion adjacent the processing station, the proximal end portion comprising a second drive roller for driving the outfeed conveyor belt; and
the drivetrain transferring torque from the drive motor to the drive roller of the outfeed conveyor, the drivetrain comprising a quick-disconnect drive link between the drive motor and the drive roller of the outfeed conveyor.

* * * * *